Figure 1:
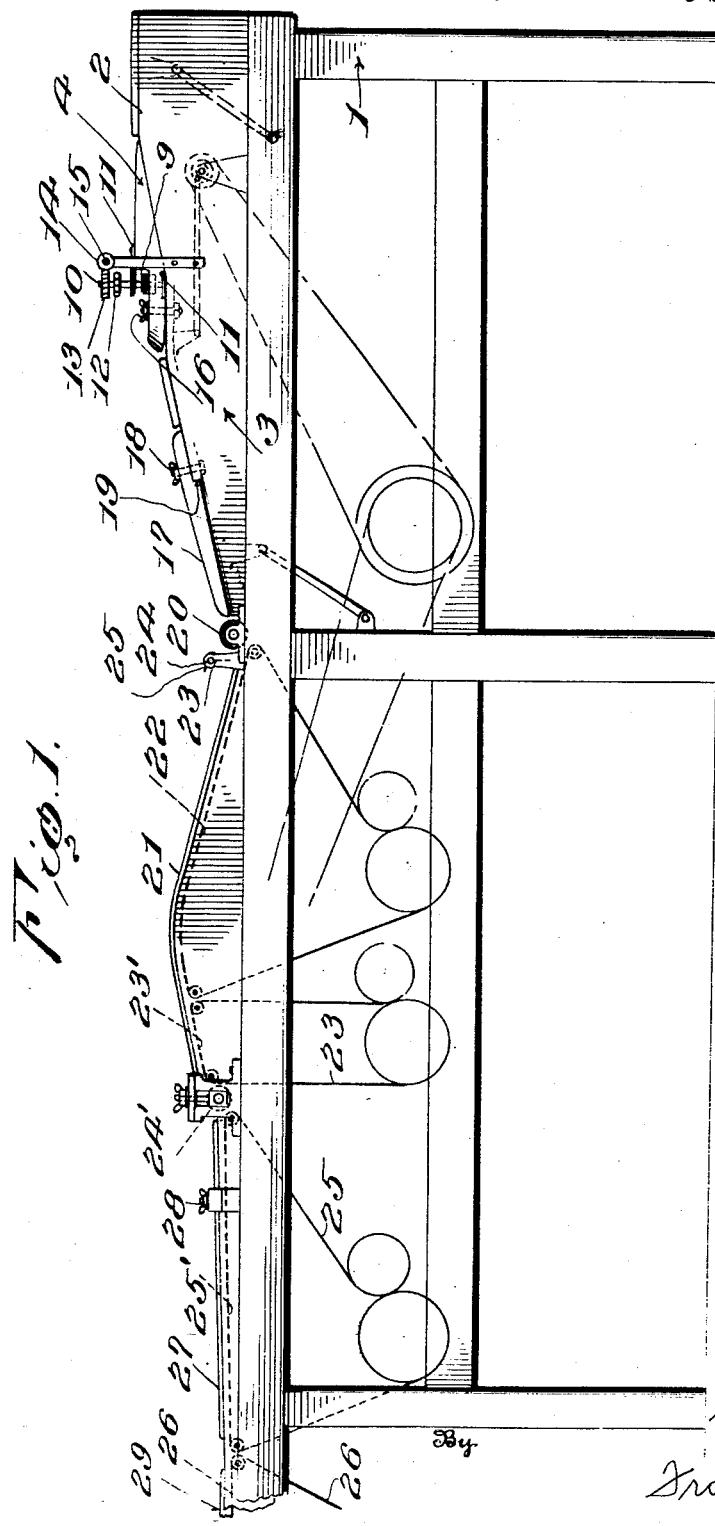

May 1, 1928.  1,667,955

G. SMITH

FACING AND ASSEMBLING MACHINE

Filed Nov. 23, 1923  3 Sheets-Sheet 1

Inventor
George Smith
By Francis P. Maguire
Attorney

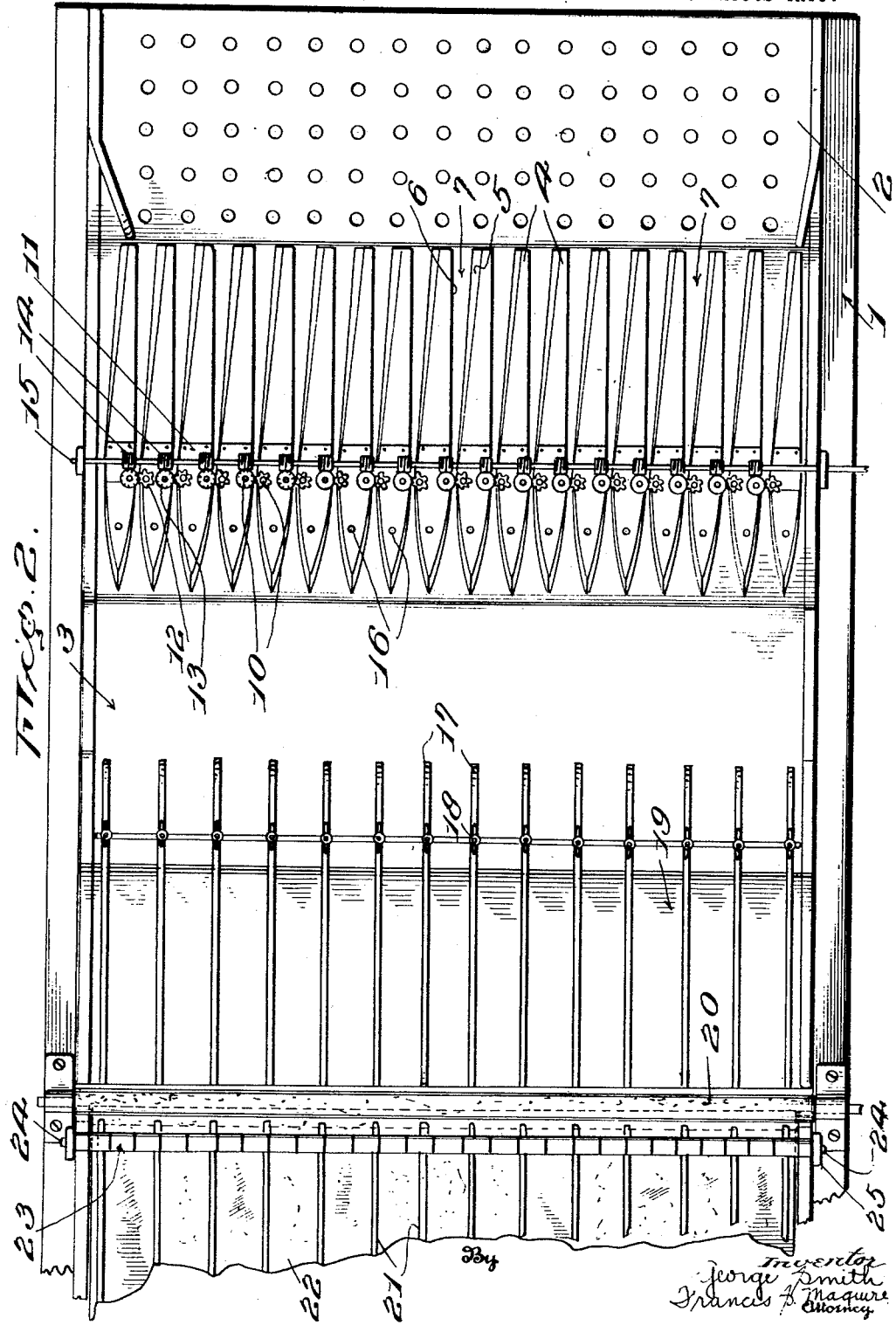

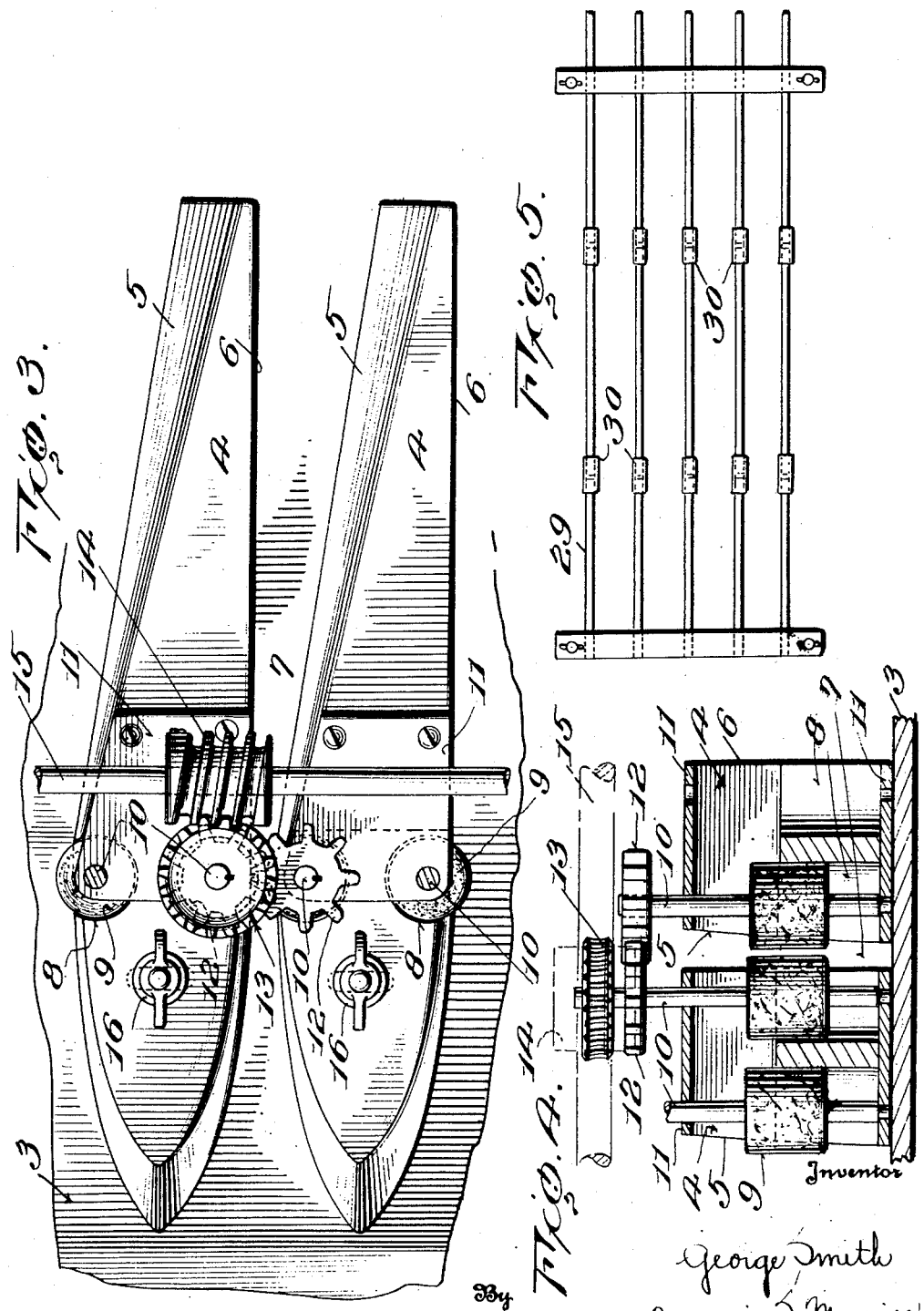

Patented May 1, 1928.

1,667,955

UNITED STATES PATENT OFFICE.

GEORGE SMITH, OF RICHMOND, VIRGINIA, ASSIGNOR TO NATIONAL BISCUIT COMPANY, OF NEW YORK, N. Y., A CORPORATION OF NEW JERSEY.

FACING AND ASSEMBLING MACHINE.

Application filed November 23, 1923. Serial No. 676,615.

This invention has for its object to provide a machine for accurately facing biscuits from a supply, and assembling the faced biscuits in stacked formation for being subsequently packed in cartons or boxes.

In Patents Nos. 420,743 and 424,435, granted February 4, 1890, and March 25, 1890, respectively, to E. S. Bright and myself, facing machines are shown which, in practice, have been found to fail to function properly in that now and then a biscuit would turn or face on the wrong side and for this reason the facers were not absolutely reliable. Therefore, this invention resides in a mechanical facer which will accommodate biscuits of varying sizes and thicknesses and accurately face the same. The invention also resides in means for separating and straightening the biscuits subsequent to being faced; a system of aprons to assemble and deliver the biscuits; and an improved stacking device for initiating the stacking of the biscuits, the term "biscuits" being employed throughout the description and claims in its generic sense.

In the drawings, Figure 1 is a view in side elevation of my improved biscuit packing machine. Figure 2 is a top plan view. Figures 3 and 4 are details of the facer, and Figure 5 is a plan view of a biscuit guide.

The framework 1 supports at one end portion the vibratory biscuit facer to which the biscuits, crackers, or the like, are fed, as from a hopper, or by being dumped thereon directly from the baking pans. In advance of the facer and connected thereto so as to vibrate therewith is a foraminous platform 2 for separating or sifting the crumbs from the biscuits as they are fed thereacross, said crumb separator or platform being slightly tilted toward the facer to direct the biscuits in their travel thereover.

The biscuit facer includes an inclined table 3 which is mounted to be vibrated by mechanism not shown. On one upper, forward end of the table is mounted a plurality of biscuit guides 4, each having its forward end portion provided with a beveled wall 5, to divert the biscuits into the runways between adjacent guides, and a vertical side face 6, the latter cooperating with the opposing beveled face of the next adjacent guide for defining a runway or slot 7 down which the biscuits roll. The forward ends of the guides are tapered so that biscuits may readily enter the mouth of each slot.

The lower ends of the guides are formed in their opposite sides with pockets 8 in which are arranged vertically disposed cylindrical rollers 9 of soft sponge rubber, or the like, having their peripheries projecting into the runways to engage frictionally the biscuits as they pass therebetween. The shafts 10, on which the rollers 9 are fixed, are journaled in metal plates 11 extending across the pockets 8, the upper ends of each pair of shafts having intermeshing gears 12 above the upper plate 11 and one shaft being extended to carry a worm gear 13 in meshing relation with a driving worm 14 on a drive shaft 15. The drive shaft is mounted transversely of the facer for driving the several pairs of rollers, and is itself driven from a source of power (not shown) as by a belt and pulley connection. The rollers 9 extend short of the floor of the runways and are designed to engage the biscuits well above their lower arcs and above their centers. The biscuits or other articles being faced should be of that type which present faces extending at angles to each other, or which have beveled edge-portions. Usually this type of biscuit has a substantially flat lower face and a convex upper face. Thus, as the biscuit passes between a pair of rollers the latter will yieldingly engage the opposite faces thereof. Due particularly to the differential pressure upon opposite faces of the biscuit (particularly caused by the differing faces of the latter and the characteristics of the rollers), and, due also to the difference in contact area between the rollers and biscuit faces, the biscuits upon their release from the rollers will be inclined with respect to the conveying table 3. Beyond the rollers the extremities of the guides are pointed or tapered so that the side walls of each runway not only diverge at the lower end but also flare upwardly or lean from the perpendicular. This provision maintains the moving biscuits at the inclination initiated by the rollers, or augments such inclination, which is in the direction in which their edges bevel so that thereby the inherent bevel on the edges of the various biscuits is taken advantage of and utilized to assist in turning the same. Spacing bolts 16 are provided for varying the width of the runways 7 to accommodate biscuits of different thicknesses, the guides being set beforehand to accommodate the particular type or style of biscuit.

The rollers are pre-set for the thinnest biscuits in a batch so that should the biscuits vary in thickness, the rollers, having vibratory motion, and being positively driven will cause the same to pass therebetween during which the pliable rollers will yield. Thus, biscuits of double the thickness for which the guides are set may pass between the rollers. The provision of these rollers defines yieldable, anti-friction wall portions for the runways and insures the passage of the biscuits between the rollers in an upright position and the proper facing of the same.

Having been faced, the biscuits now enter between longitudinal guides 17, on the table, these likewise being relatively adjustable by the spacer devices 18 for different varieties of biscuits. The lower end portion of the table is offset to a lower plane to form a step or shoulder 19 over which the biscuits and any collected crumbs may pass to obviate any jamming or congestion thereat.

A separating and straightening roller 20 is journaled at the lower end of the facer table, the same having a sufficiently soft rubber face so that the biscuits will be frictionally gripped thereby and carried thereover. This roller is rotated at a rapid rate of speed and will effect a throwing or tossing of the biscuits individually thereover. Consequently, if two or more biscuits are stacked on their approach to the roller the lower one, being the first to have a face contact with the roller, will be quickly slipped from beneath the superposed ones and thrown to the other side of the roller. For square, oblong or irregular shaped biscuits, the facer table guides 17 are spaced to the width of the biscuits, and therefore cannot enter but the narrow way. In their passage down the facer table there may be a number of biscuits which do not enter the guides fully or properly. When this is the case one end of the biscuit will lie between the guides and the other part of the biscuit on the guide or rail. Consequently, when the biscuit reaches the roll in this position with one end lower than the other end, the low end coming in contact with the roller first, will be turned and tossed between the guides 21 in proper position.

The biscuits are delivered by the roller 20 onto an endless apron 22 which travels beneath and is longitudinally divided into channels by the guides 21, said guides practically forming continuations of the facer table guides 17. Within the channels are freely suspended fingers 23 set slightly forward and a little higher than the thickness of the biscuit. These fingers are strung on a transverse rod 24 which is mounted on arms 25 for being adjusted to any position desired. Should two or more biscuits be stacked one upon the other as they approach the fingers the upper one or ones will be arrested by the same and held so until there is space for them to drop in. The apron 22 rises at an incline and leads over a crest and partway down on the opposite side thereof where it delivers to a downwardly inclined and slower moving apron 23'. The faster moving apron 22 will therefore deliver the biscuits to the endless apron 23' in closer order than they assumed on the former. The apron 23' constitutes also a guide for the biscuits for if the apron 22 delivers faster than the apron 23' removes then the biscuits will simply push those in advance down the inclined surface of said slower moving apron.

The biscuits are delivered by apron 23' to a second, rapidly rotating roller 24' having a friction face of rubber to take hold of the biscuits and throw or jump them onto a still slower traveling apron 25' and thereby effect an overlapping of the cakes by reason of such relatively reduced speed of travel of said apron 21. Apron 25' delivers the goods to a still slower traveling apron 26 which receives the overlapped goods from apron 25' and, by reason of such relatively reduced speed of travel, causes a closer formation of stacked biscuits which are then removed by attendants or otherwise. Aprons 22 and 23' are vertically adjustable to conform with roller 24' which is also vertically adjustable for biscuits of different sizes to properly effect an initial stacking thereof on the apron. Thus, for small biscuits the roller 24' would be adjusted low while for larger biscuits said roller is raised to increase the drop to the apron 25'. Longitudinal guides 27 similarly divide the apron 25' into channels, the widths of which may be determined by the spacer 28. Apron 26 is also equipped with guides 29 which are of a flexible nature to conform closely to the moving apron and thereby prevent the biscuits from wedging beneath the guides and interfering with the proper operation of the machine. As herein depicted, each guide 29 comprises a plurality of longitudinally alined, short sections flexibly connected or linked together by inverted U-shaped or channel fittings 30 which also inclose the adjacent ends of said sections.

In operation, the biscuits are fed or dumped onto the vibrating platform 2 to sift out the crumbs, following which the constantly agitated biscuits pass into the facer which faces them bottom up. The biscuits are then delivered by the roller 20 to the apron 22 which feeds to a slower moving apron 23' to relate them closer, and from this latter apron the biscuits are thrown onto the still slower moving apron 25' in overlapping or partially stacked relation. The biscuits are further stacked by being delivered onto the still slower moving apron 26 from which they are removed and packed into boxes or cartons.

I claim as my invention:

1. In a biscuit manipulating machine, a biscuit facing means, an endless conveyor for receiving the biscuits from the facing means, and flexible guides dividing the conveyor longitudinally into channels and adapted for flexing with the biscuit supporting flight of the conveyor.

2. In a biscuit manipulating machine, flexible guides for biscuit conveying aprons, each guide comprising sections pivotally connected together to flex with an underlying apron.

3. A biscuit-facing machine, including a pair of rollers having vertical axes, and means for driving said rollers.

4. A biscuit-facing machine, including a pair of rollers having substantially vertical axes and resilient contact faces, means for driving said rollers, means for delivering biscuits to the same, and means receiving the faced biscuits after their discharge from said rollers.

5. A method of facing biscuits or other flat articles, each having a convex face or beveled edge-portion, which method includes arranging the articles so that they rest upon their edges, thereafter subjecting the opposite faces of each article to yielding and evenly distributed pressure to cause the same to assume an inclined position, and subsequently releasing said articles with corresponding faces of different articles extending in the same direction.

6. A method of handling biscuits or other substantially flat articles, each having a convex face or beveled edge-portion, which method includes arranging the articles so that they rest upon one of their edge-portions, thereafter gripping the two faces thereof to incline the bodies of the articles thereupon increasing such inclination and releasing them upon a substantially horizontal supporting surface with similar faces of different articles extending in the same direction.

7. A biscuit-facing machine, including a supporting surface upon which the biscuits are to be disposed, means for moving the biscuits with respect to the machine, means cooperating with the biscuits to dispose of the same to rest upon their edge-portions, and means beyond said latter means for facing said biscuits.

8. A biscuit-facing machine, including means for engaging the biscuits to cause the same to assume positions resting upon their edge-portions and in rolling contact with said means, means for delivering biscuits to said means, and biscuit-facing means beyond said means.

9. A biscuit-facing machine, including a pair of guides, one of said guides being formed with a beveled side wall, means for moving biscuits within the space between the adjacent side walls of said guides whereby to cause said biscuits to be engaged by said beveled side wall and to be arranged in a position at which they rest upon their edge-portions, and means adjacent said guides for facing the biscuits when thus arranged.

10. A biscuit-facing machine, including a biscuit-supporting member, guides associated with the same, means whereby biscuits will move between said guides, means for causing said biscuits to have their bodies disposed at an angle to that which they assumed when initially delivered to said supporting member, and pairs of rollers adjacent said guides for engaging the biscuits to face the same.

11. A biscuit-facing machine, including a member adapted to receive and support biscuits, pairs of spaced guide members adjacent the rear end of said first-named member, means for moving biscuits with respect to said guides and between the same to cause the bodies of said biscuits to assume positions at an angle to that at which they were originally disposed upon said supporting member, and pairs of driven facing rollers associated with said guide members and extending into the space between the same to grip said biscuits and to face the same.

12. A machine of the class described, including, in combination, a substantially horizontal supporting member, a pair of yielding rollers having substantially vertical axes, their peripheries engaging opposite faces of a flat article having one of its faces beveled and supported upon said member, means for synchronously driving said rollers whereby to exert pressure upon the edge of said article to cause the body of the same to assume a position in a plane at an angle to the normal direction of feed and to emphasize the angular disposition thereof to said supporting member by having the roller contacting with the beveled face remain in engagement therewith throughout a greater period of time than the roller in contact with the opposite face thereof.

In testimony whereof I have signed this specification.

GEORGE SMITH.